United States Patent [19]

Davis

[11] Patent Number: 5,877,724
[45] Date of Patent: Mar. 2, 1999

[54] COMBINED POSITION LOCATING AND CELLULAR TELEPHONE SYSTEM WITH A SINGLE SHARED MICROPROCESSOR

[75] Inventor: Paul M. Davis, Sunnyvale, Calif.

[73] Assignee: Trimble Navigation Limited, Sunnyvale, Calif.

[21] Appl. No.: 829,828

[22] Filed: Mar. 25, 1997

[51] Int. Cl.$^6$ .............................. G01S 5/02; H04B 7/185
[52] U.S. Cl. ........................................ 342/357; 701/213
[58] Field of Search ................................ 342/357, 457; 701/213; 379/58, 59

[56] References Cited

U.S. PATENT DOCUMENTS

| | | | |
|---|---|---|---|
| 5,043,736 | 8/1991 | Darnell et al. | 342/357 |
| 5,334,974 | 8/1994 | Simms et al. | 340/998 |
| 5,389,934 | 2/1995 | Kass | 342/357 |
| 5,479,479 | 12/1995 | Braitberg et al. | 375/58 |
| 5,504,482 | 4/1996 | Schreder | 340/995 |
| 5,515,043 | 5/1996 | Berard et al. | 340/998 |
| 5,555,286 | 9/1996 | Tendler | 379/59 |
| 5,625,668 | 4/1997 | Loomis et al. | 379/58 |
| 5,630,206 | 5/1997 | Urban et al. | 455/54.1 |

Primary Examiner—Thomas Tarcza
Assistant Examiner—Dao L. Phan
Attorney, Agent, or Firm—Wagner,Murabito&Hao

[57] ABSTRACT

A compact combined position locating and analog cellular telephone unit. A single processor is coupled to a position locating system and a cellular telephone system. In the present invention, the single processor controls the functions and operation of both the position locating system and the cellular telephone system. In one embodiment, the position locating system, the cellular telephone system and the single processor are all disposed on a single substrate.

25 Claims, 16 Drawing Sheets

5,877,724

COMBINED POSITION LOCATING AND CELLULAR TELEPHONE SYSTEM WITH A SINGLE SHARED MICROPROCESSOR

TECHNICAL FIELD

This invention relates to GPS and cellular telephone devices. Specifically, the present invention relates to a combined GPS and analog cellular telephone unit.

BACKGROUND ART

Portable global positioning system (GPS) devices, such as the Scout by Trimble Navigation, Ltd. of Sunnyvale, Calif. and hand-held cellular telephone devices, such as the Micro Tac flip-phones by Motorola, Inc. of Schaumberg, Illinois are well known in the prior art. Combined position locating and cellular telephone devices are also known in the art. The combined position locating system and cellular telephone devices commonly operate in different regimes and function independently of each other. An example of a prior art combined position locating and cellular telephone device is shown, for example, in U.S. Pat. No. 5,043,736 to Darnell et al. The position locating portion of Darnell's device includes an antenna, an RF "L" band receiver, a position locating demodulator, a dedicated microprocessor, and RAM. The cellular telephone portion of the L band signals received at the antenna are for a global positioning system, and a cellular phone system. Prior art combined position locating and cellular telephone devices typically include a complete position locating system including a dedicated position locating microprocessor. The complete position locating system and dedicated position locating microprocessor occupy at least one printed circuit board. Prior art combined position locating and cellular telephone device further includes a complete cellular telephone system and a dedicated cellphone microprocessor for controlling cellular telephone functions. The cellular telephone system and dedicated cellphone microprocessor also occupy at least one other printed circuit board. Therefore, prior art combined position locating and cellular telephone devices have at least two microprocessor units and occupy at least two printed circuit boards or other similar substrates. Thus, prior art combined position locating and cellular telephone devices are much bulkier and are more complex than conventional stand-alone position locating or standalone cellular telephone systems.

As an additional disadvantage, prior art combined position locating and cellular telephone devices suffer from significant drawbacks. That is, prior art combined position locating and cellular telephone devices are more expensive, and are more complex than conventional stand-alone position locating or cellular telephone systems. The additional bulk, cost, and complexity associated with such devices may not appeal to a consumer.

Thus, the need has arisen for a position locating and cellular telephone combination which does not have the additional bulk, cost, and complexity associated with prior art combined position locating and cellular telephone devices.

DISCLOSURE OF THE INVENTION

It is therefore an object of the present invention to provide a position locating and analog cellular phone combination which does not have the additional bulk, cost, and complexity associated with prior art combined position locating and analog cellular telephone devices. The above object has been achieved by a compact combined position locating and analog cellular telephone unit having single shared processor. In the present invention, a single shared processor is coupled to both the position locating system and the cellular telephone system. The single shared processor controls both the position locating system and the cellular telephone system. In one embodiment of the present invention, the position locating system and the cellular telephone system are disposed on a single substrate.

In another embodiment, the single shared processor has a cellular telephone baseband system integral therewith.

In yet another embodiment, the single shared processor has a position locating baseband system integral therewith.

In still another embodiment, the single shared processor has both a cellular telephone baseband system and a position locating system integral therewith.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

HARDWARE IMPLEMENTATIONS OF PRESENT INVENTION

Figure 1:
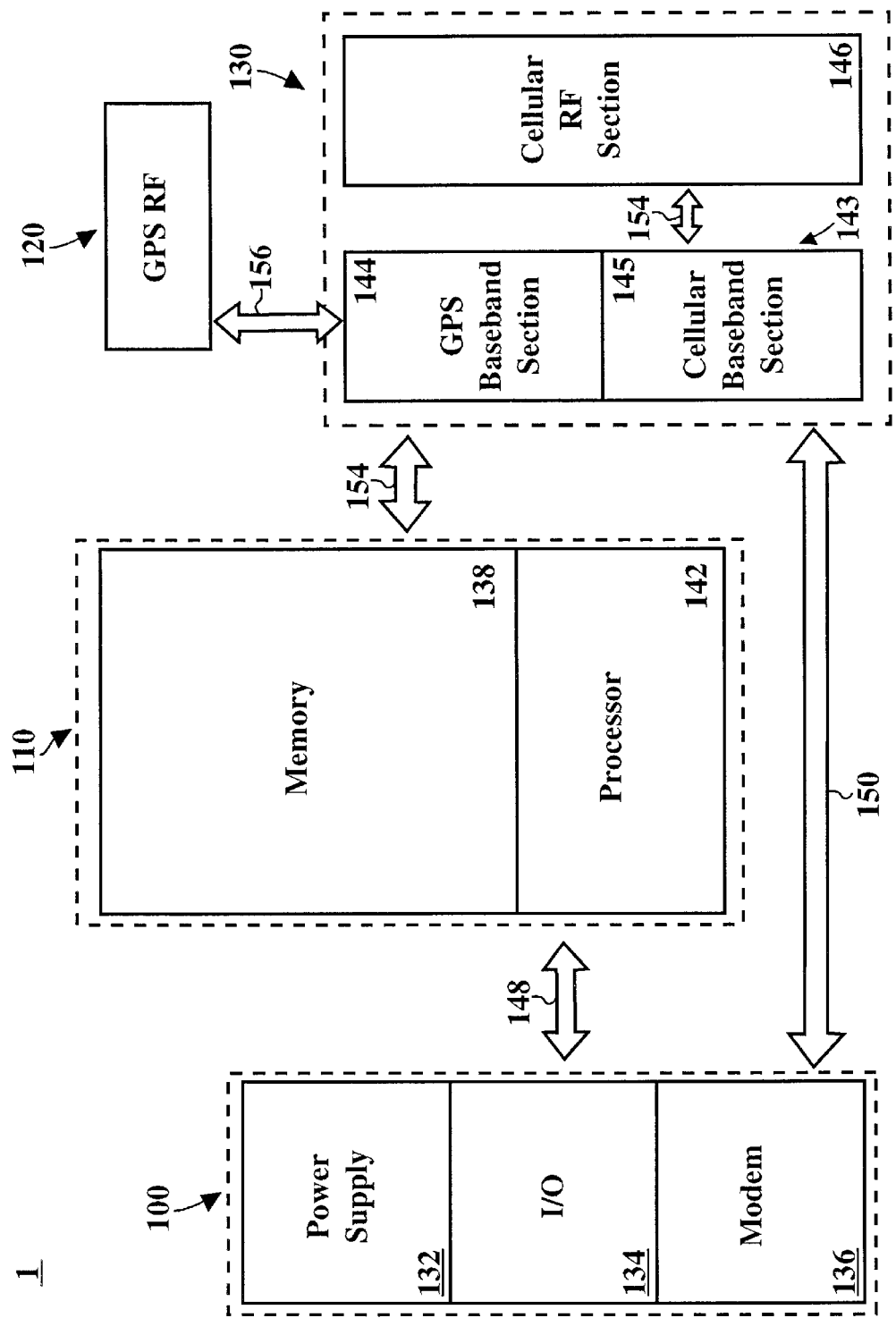
FIG. 1 is a schematic diagram of components used in one embodiment of a single processor combined position locating and analog cellular telephone system in accordance with the present claimed invention.

With reference to FIG. 1, a schematic diagram of components of the single processor combined position locating and analog cellular telephone system of the present invention is shown. The present invention includes a power and input output (I/O) portion, a single processor portion 110, a GPS RF portion 120, and a shared baseband and RF portion 130. In the present embodiment, portions 100, 110, 120, and 130 are disposed on a single substrate such as, for example, a single printed circuit board. The present invention is also well suited to having portions 100, 110, 120, and 130 located on more than one substrate.

As shown in FIG. 1, portion 100 of the present invention includes a power supply 132 for providing power to the present single processor combined GPS and cellular telephone invention. I/O circuitry 134 is also contained within portion 100 for receiving and transmitting control signals to interface with, for example, external peripheral devices coupled to the present invention. Such external peripheral devices include, for example, panic buttons, vehicle alarms, and the like. The present invention further includes a modem 136. Modem 136 of the present embodiment is a one chip modem LSI applicable to transceiving both fax and data. Modem 136 also requires low power and can be operated in the 3.3–5 volt range. In the present embodiment, modem 136 is a YTM411B modem available from Yamaha Corporation of Tokyo, Japan.

As shown in portion 110 of FIG. 1, the present invention also includes memory 138 such as read only memory (ROM), erasable programmable ROM (EPROM), flash EPROM, electrically erasable and programmable ROM (EEPROM), and random access memory (RAM). The present invention is further comprised of a single microprocessor 142. In the present invention, the single microprocessor is a 68332 microprocessor available from Motorola, Inc. of Schaumberg, Ill. Although such a microprocessor is used in the present embodiment, the present invention is also well suited to using various other commercially available microprocessors as the single microprocessor of the present invention.

Referring still to FIG. 1, the present invention also includes a GPS RF portion 120. In the present embodiment, the GPS RF portion is comprised of a GPS RF receiver readily available from vendors such as, for example, Trimble Navigation, Ltd. of Sunnyvale, Calif.

The present invention also includes a shared baseband and RF portion. Portion 130 is referred to as a shared baseband and RF portion because portion 130 performs cellular telephone baseband and cellular telephone RF related operations and GPS baseband operations. As shown in FIG. 1, portion 130 includes a baseband section 143 and an cellular RF section 146. In the present embodiment, baseband section 143 is comprised of a GPS baseband section 144 and cellular baseband section 145. GPS baseband section 144 of the present embodiment is comprised of a Maxwell GPS baseband section available from Trimble Navigation, Ltd. of Sunnyvale, Calif. Cellular baseband section 145 is comprised of the baseband section of an AMPS/(E) TACS chip-set by Phillips Semiconductors of New York, N.Y. Although such baseband sections are employed in the present embodiment, the present invention is also well suited to the use of various other baseband sections.

Referring still to FIG. 1, GPS and cellular baseband sections 144 and 145, respectively, include, for example, RF signal sampling circuitry, analog-to-digital converter circuitry, analog processing circuitry, digital processing circuitry, and audio and data multiplexing and interface hardware. Cellular RF section 146 of the present invention includes, for example, master synthesizing circuitry, amplifying circuitry, and filtering circuitry. In the present invention, cellular RF section 146 is provided in readily available analog cellular chip-sets. In the present embodiment, the analog cellular chip-set is comprised of an AMPS/(E) TACS chip-set by Phillips Semiconductors of New York, N.Y. However, in the present embodiment, the present invention controls the operation of the Phillips AMPS/(E) TACS chip-set with aforementioned single shared microprocessor 142 instead of the microcontroller provided as a part of the Phillips AMPS/(E) TACS chip-set. As indicated by arrows 148, 150, 152, 154, 156, and 158, portions 100, 110, 120, and 130 are electrically interconnected such that single shared microprocessor 142 can control both cellular and GPS functions. Thus, the present invention controls both GPS and cellular telephone functions using single shared microprocessor 142.

Figure 2:
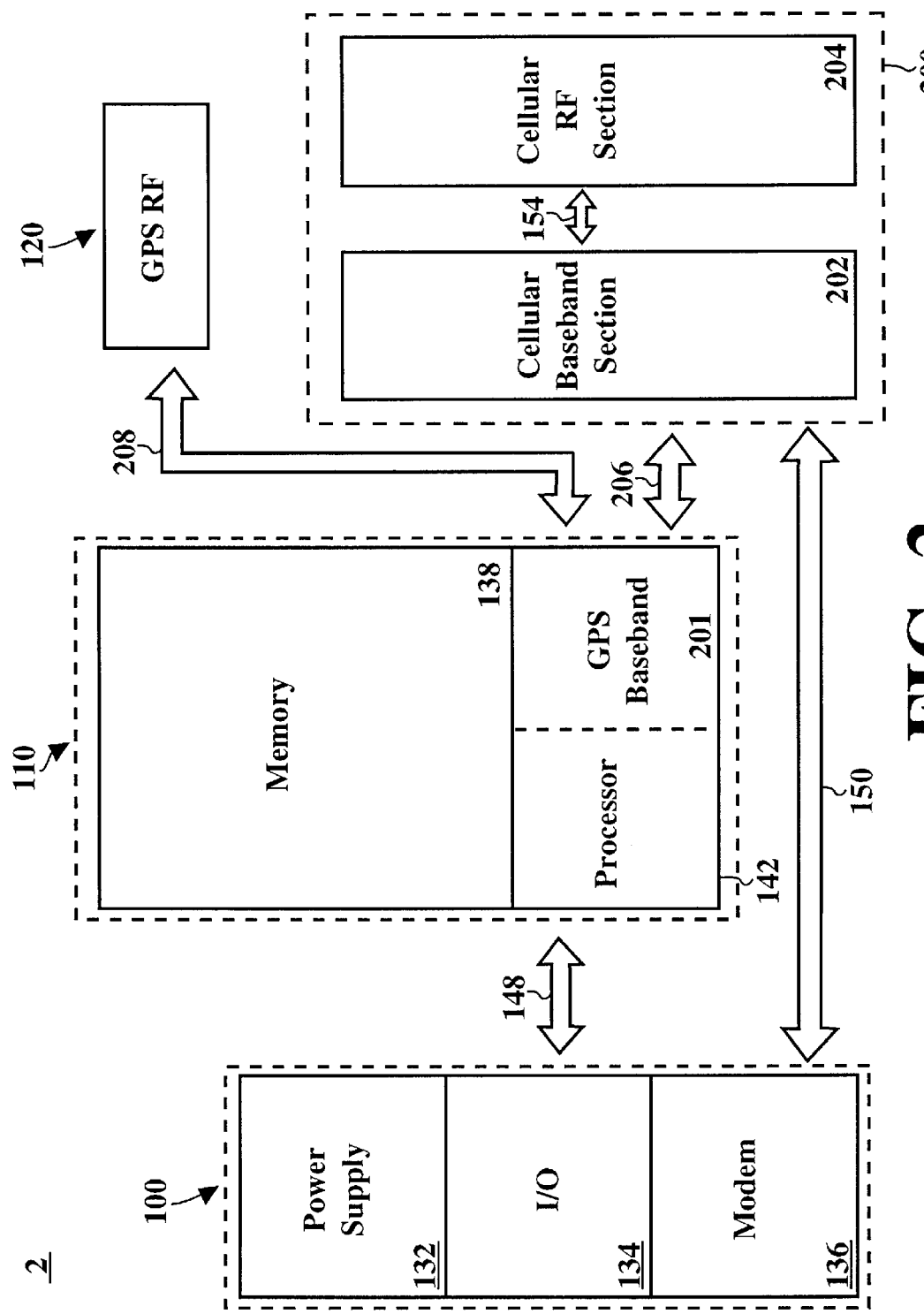
FIG. 2 is a schematic diagram of components used in another embodiment of a single processor combined position locating and analog cellular telephone system in accordance with the present claimed invention.

Referring now to FIG. 2, another embodiment of the present invention is shown in which a GPS baseband section 201 is integral with single shared microprocessor 142. In the present embodiment, single shared processor 142 is a Scorpion microprocessor available from Trimble Navigation, Ltd. of Sunnyvale, Calif. A detailed description of the aforementioned Scorpion microprocessor is found in U.S. Pat. No. 5,504,684 to Chung Y. Lau et al. U.S. Pat. No. 5,504,684 filed Dec. 10, 1993, and issued Apr. 2, 1996. The Lau et al. patent 5,504,684 is incorporated herein by reference.

In the embodiment of FIG. 2, a shared cellular baseband and RF section 200 is communicatively coupled, as indicated by arrow 206, to single shared processor 142. In the present embodiment, analog cellular chip-set 200 is comprised of an AMPS/(E) TACS chip-set by Phillips Semiconductors of New York, N.Y. GPS RF portion 120 is also communicatively coupled, as indicated by arrow 208 to single shared processor 142. As in the embodiment of FIG. 1, the present embodiment controls both GPS and cellular telephone functions using a single shared microprocessor 142.

Figure 3:
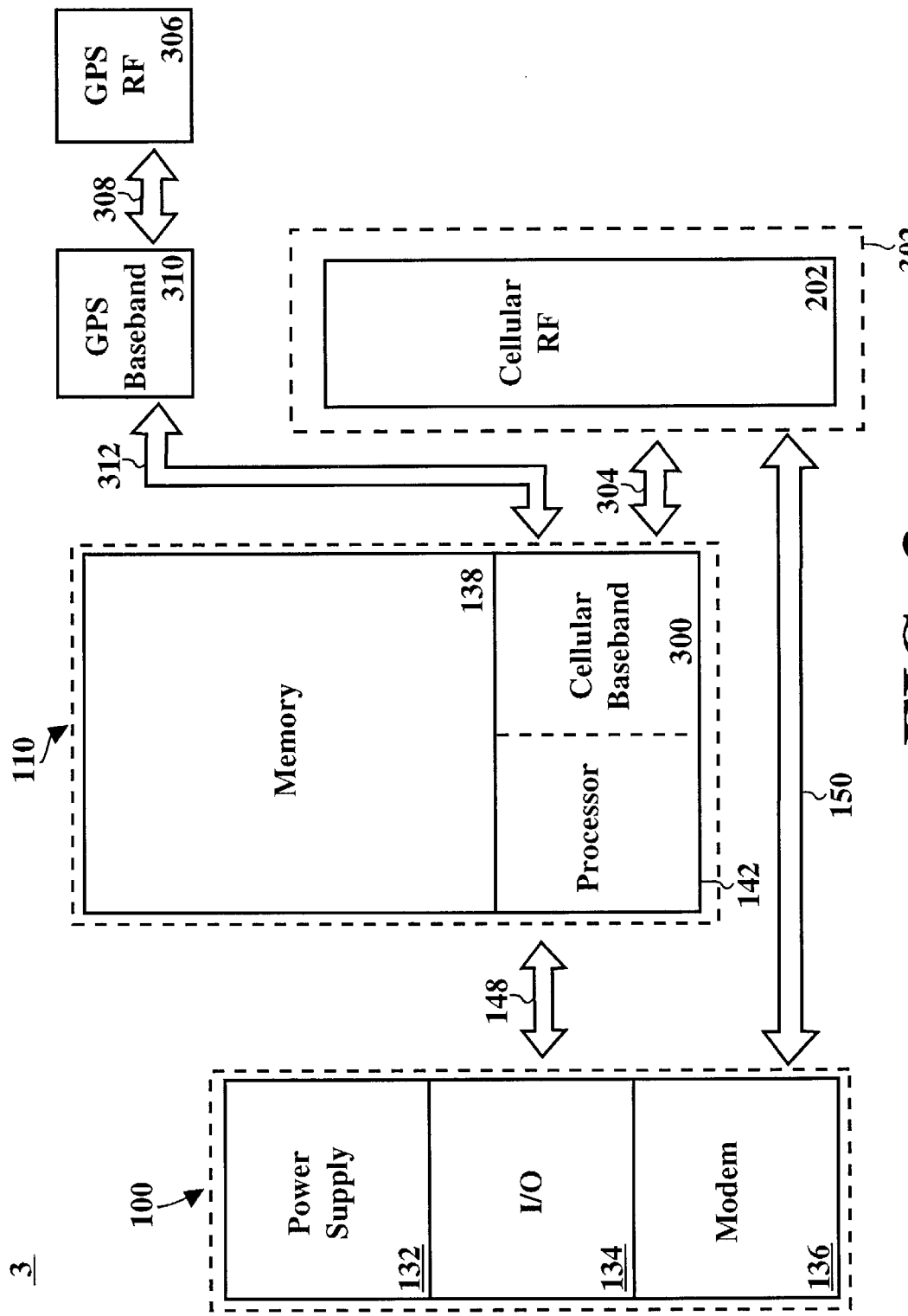
FIG. 3 is a schematic diagram of components used in yet another embodiment of a single processor combined position locating and analog cellular telephone system in accordance with the present claimed invention.

Referring now to FIG. 3, yet another embodiment of the present invention is shown in which a cellular telephone baseband section 300 is integral with single shared microprocessor 142. In the present embodiment, a cellular RF section 302 is communicatively coupled, as indicated by arrow 304, to single shared processor 142. In the present embodiment, cellular RF section 302 is comprised of the RF portion of an AMPS/(E) TACS chip-set by Phillips Semiconductors of New York, N.Y.

With reference still to FIG. 3, the present embodiment also includes a GPS RF portion 306 which is communicatively coupled, as indicated by arrow 308, to a GPS baseband section 310. In the present embodiment, the GPS RF portion 306 is comprised of a GPS RF receiver readily available from vendors such as, for example, Trimble Navigation, Ltd. of Sunnyvale, Calif. GPS baseband section 310 is comprised of a Maxwell GPS baseband section also available from Trimble Navigation, Ltd. of Sunnyvale, Calif. GPS baseband portion 310 is communicatively coupled to single shared microprocessor 142 as indicated by arrow 312. In the present embodiment, single shared processor 142 controls both GPS and cellular telephone functions.

Figure 4:
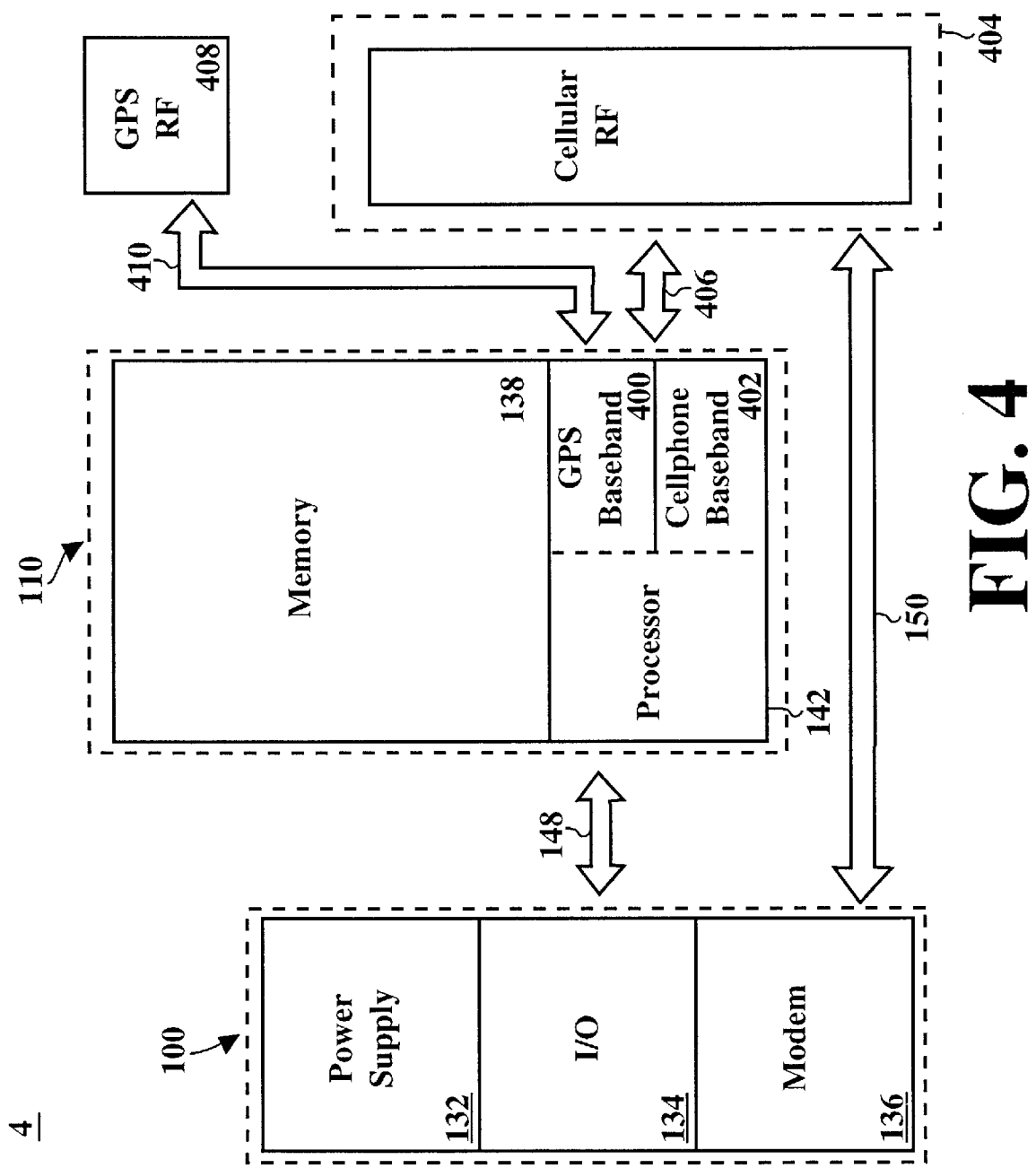
FIG. 4 is a schematic diagram of components used in still another embodiment of a single processor combined position locating and analog cellular telephone system in accordance with the present claimed invention.

Referring now to FIG. 4, still another embodiment of the present invention is shown in which both a GPS baseband section 402 and a cellular telephone baseband section 400 are integral with single shared microprocessor 142. In the present embodiment, a cellular RF section 404 is communicatively coupled, as indicated by arrow 406, to single shared processor 142. In the present embodiment, cellular RF section 404 is comprised of the RF portion of an AMPS/(E) TACS chip-set by Phillips Semiconductors of New York, N.Y.

With reference still to FIG. 4, the present embodiment also includes a GPS RF portion 408 which is communicatively coupled, as indicated by 410, to single shared microprocessor 142. In the present embodiment, GPS RF portion 408 is comprised of a GPS RF receiver readily available from vendors such as, for example, Trimble Navigation, Ltd. of Sunnyvale, Calif. GPS baseband section 400 is comprised of a Maxwell GPS baseband section also available from Trimble Navigation, Ltd. of Sunnyvale, Calif. In the present embodiment, single shared processor 142 controls both GPS and cellular telephone functions.

Figure 5:
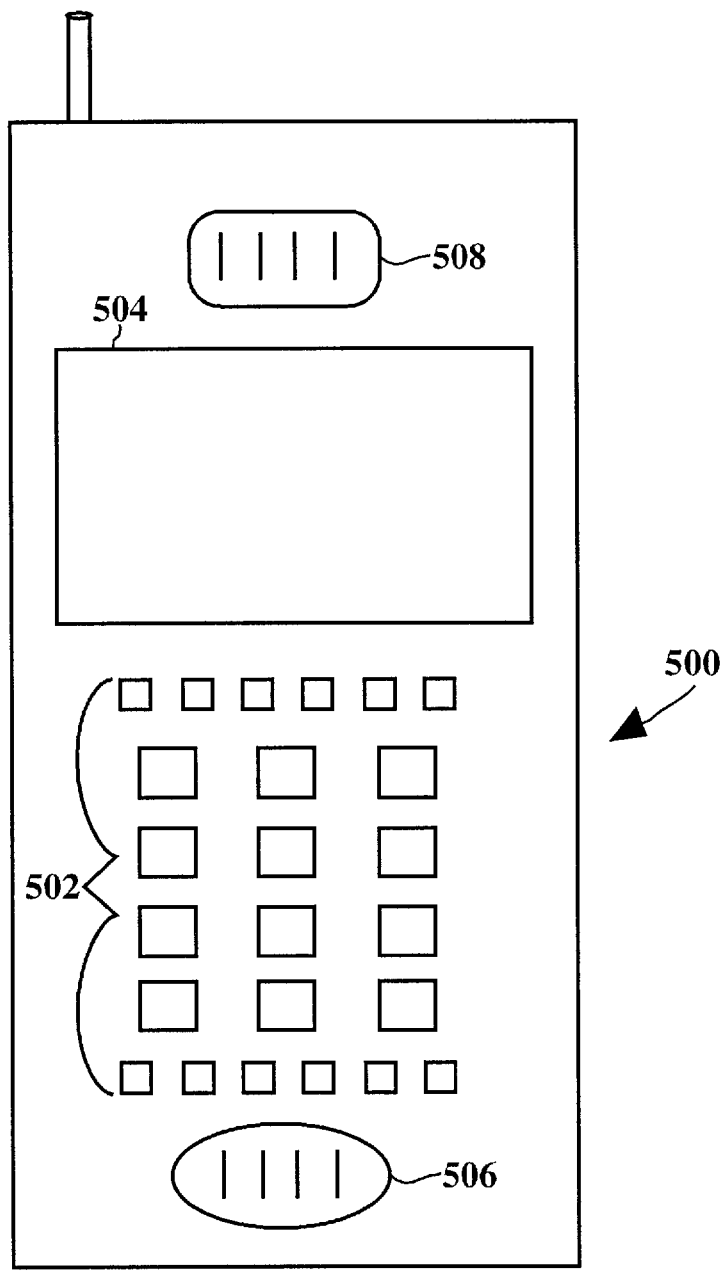
FIG. 5 is a schematic view of a single, handheld, portable position locating and analog cellular telephone unit in accordance with one embodiment of the present claimed invention.
Figure 6:
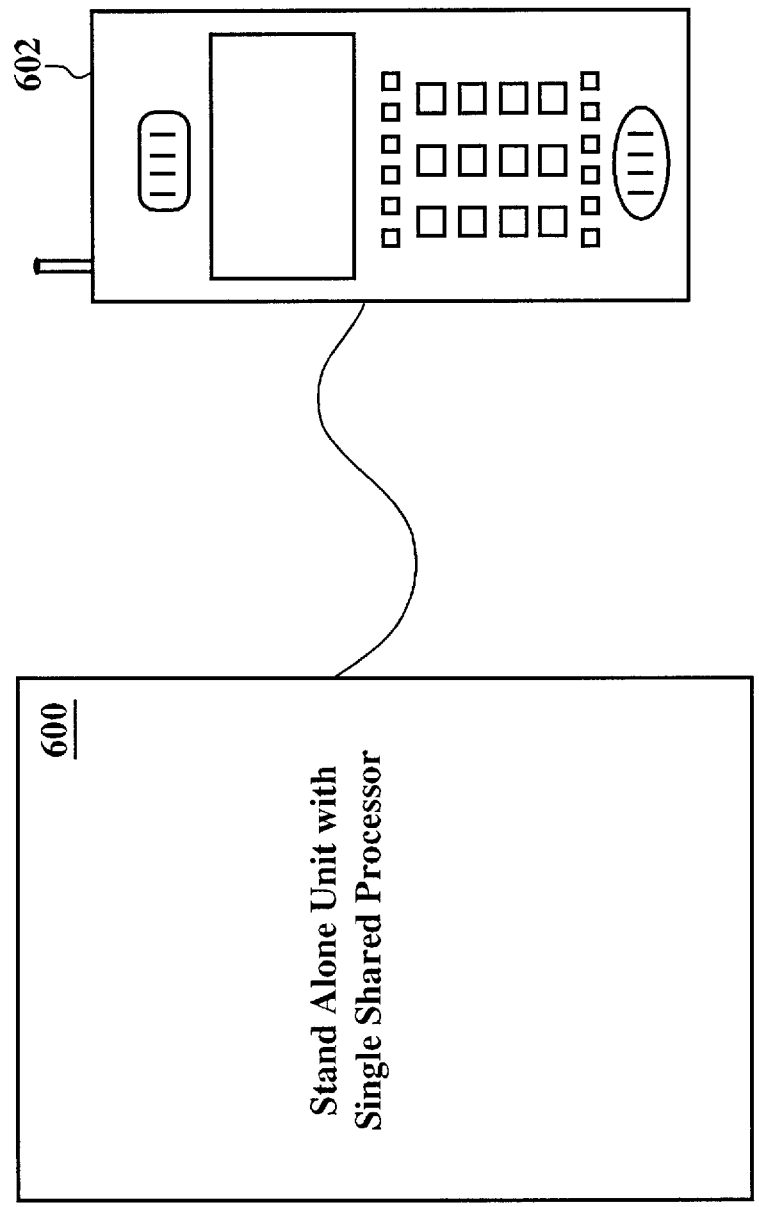
FIG. 6 is a schematic view of a stand-alone position locating unit adapted to having a telephone handset coupled thereto in accordance with one embodiment of the present claimed invention.

With reference next to FIG. 5, a schematic view of a single, handheld, portable position locating and analog cellular telephone unit in shown. By controlling both position locating and analog cellular telephone functions with single shared processor 142, combined position locating and analog cellular telephone unit 500 of the present invention is compact and portable. In combined position locating and analog cellular telephone unit 500, keyboard entries made at a keyboard 502 are used to operate both cellular telephone and position locating functions. That is, keyboard 502 can be used, for example, to generate position information, cellular telephone information, or both position information and cellular telephone information on display screen 504. Keyboard 502 is also used to control cellular telephone functions utilizing microphone 506 or earphone 508. Although combined position locating and analog cellular telephone unit 500 is comprised of a single, handheld, portable unit in the present embodiment, the present invention is also well suited to various other configurations. These configurations include, for example, a stand-alone position locating unit 600 adapted to having an external handset 602 coupled thereto for performing cellular telephone functions, as shown in FIG. 6. In both of the embodiments of FIG. 5 and FIG. 6, single shared processor 142 of FIGS. 1–4 controls the operation of both position locating and analog cellular telephone components. The present invention is also well suited to an embodiment in which no voice capabilities are present.

Figure 7:
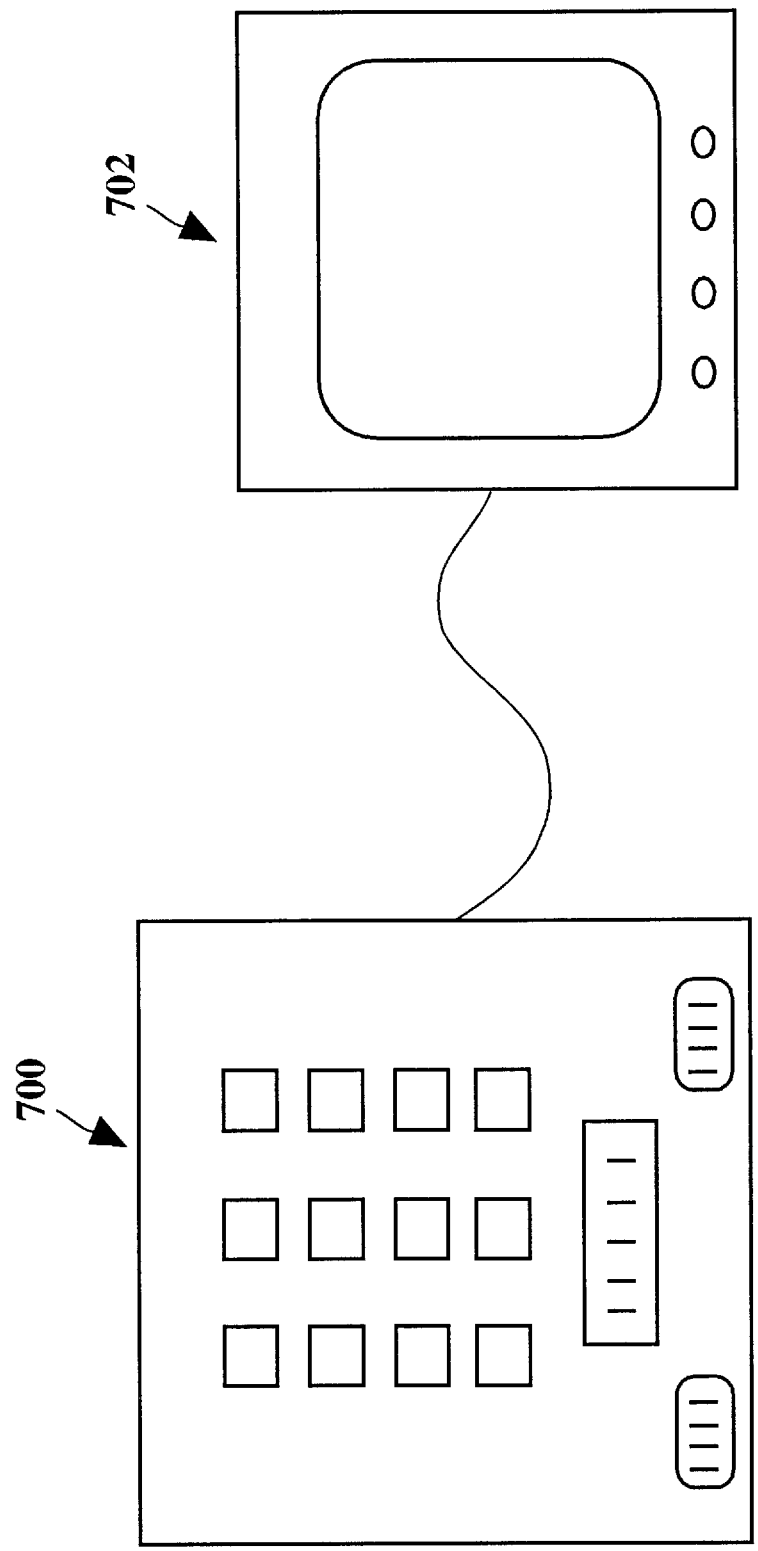
FIG. 7 is a schematic view of a stand-alone position locating and analog cellular telephone unit adapted to having a display unit coupled thereto in accordance with one embodiment of the present claimed invention.

With reference next to FIG. 7, another embodiment of the present invention in which single shared processor 142 of FIGS. 1–4 controls operation of both a position locating device and a cellular telephone system is shown. In the present embodiment, a position locating and analog cellular telephone unit 700 is adapted to having an external display 702 coupled thereto. In the embodiment of FIG. 7, as in the embodiments of FIGS. 5 and 6, single shared processor 142 of FIGS. 1–4 controls the operation of both position locating and analog cellular telephone components. The present invention is also well suited for use with a mobile data terminal (MDT) in which the external display unit contains user controls as well as a display screen.

PROCESSES OF THE PRESENT INVENTION

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "connecting," "sending," "terminating," "processing," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices.

COMPUTER SYSTEM ENVIRONMENT OF SOFTWARE IMPLEMENTATION OF THE PRESENT INVENTION

With reference again to FIG. 1, portions of the present invention are comprised of computer-readable and computer-executable instructions which reside, for example, in computer-usable media of, for example, combined position locating and analog cellular telephone unit 1 of FIG. 1. Although other embodiments of the present combined position locating and analog cellular telephone unit are given, for example, in FIGS. 2–4, for purposes of clarity the present combined position locating and analog cellular telephone unit will be referred to as combined position locating and analog cellular telephone unit 1 of FIG. 1. All of the software implementations described herein are controlled by single shared processor 142 of FIG. 1.

Figure 8:
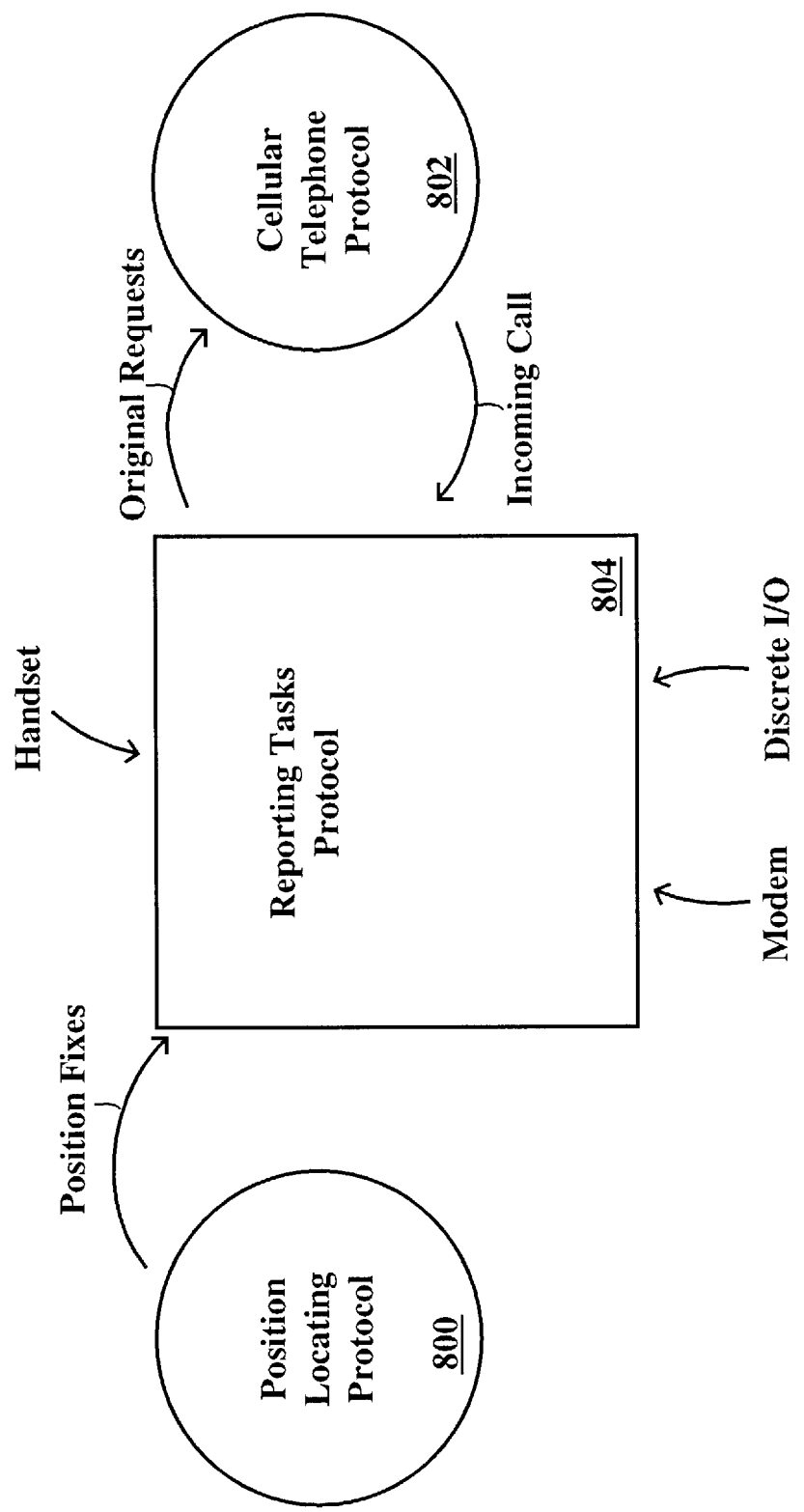
FIG. 8 is a high level schematic diagram of data flow and processes in accordance with one embodiment of the present claimed invention.

With reference next to FIG. 8, a high level schematic diagram of data flow and processes of the present claimed invention is shown. As shown in FIG. 8, the present embodiment includes a position locating protocol 800, a cellular telephone protocol 802, and a reporting tasks protocol 804. Each of protocols 800, 802, and 804 operate on single shared processor 142. In the present embodiment, single shared processor 142 has a multi-tasking operating system running thereon to accommodate each of protocols 800, 802, and 804. More specifically, in the present embodiment, single shared processor 142 utilizes a commercially available multi-tasking operating system commercially available from R & D Publishing of Lawrence, Kan. in a combination book and diskette form entitled "µC/OS The Real-Time Kernel" by Jean J. Ladrosse. Although such a multi-tasking operating system is used in the present embodiment, the present invention is also well suited to using various other multi-tasking operating systems such as, for example, a commercially available "Vertex" multi-tasking operating system.

Position locating software readily available from, for example, Rockwell Corporation operates on single shared processor 142 to run position locating protocol 800. Position locating protocol 800 generates, for example, position, time, and velocity information. Additionally, position locating protocol 800 manages such functions as, but not limited to, position acquisition, measurement, tracking, and generation of position fixes. Position locating protocol 800 also includes an interface for indicating when a new position fix has been obtained and is now available.

Also, in the present invention, AMPS cellphone software readily available from, for example, Wireless Link Corporation of Sunnyvale, Calif. operates on single shared processor 142 to run cellular telephone protocol 802. Cellular telephone protocol 802 manages such functions as, but not limited to, communicating with cellular baseband 145 of FIG. 1, communicating cellular RF section 146 of FIG. 1, assigning and switching communication channels, and the like.

With reference still to FIG. 8, reporting tasks protocol 804 interfaces with both position locating protocol 800 and cellular telephone protocol 802. Specifically, as indicated in FIG. 8, reporting tasks protocol 804 manages such functions as, but not limited to, receiving position fixes from position locating protocol 800. Reporting tasks protocol 804 also manages the interface of combined position locating and analog cellular telephone unit 1 of FIG. 1 with, for example, a handset, a modem, and/or discrete I/O from various other sources as shown in FIG. 8. Similarly, reporting tasks protocol 804 manages such functions as originating requests sent to cellular telephone protocol 802, and receiving notice of incoming calls from cellular telephone protocol 802. Although such tasks are specifically recited above, the present invention is also well suited to having reporting tasks protocol 804 manage various other functions. A detailed description of the operation and processes of the reporting tasks protocol 804 is given below.

Figure 9A:
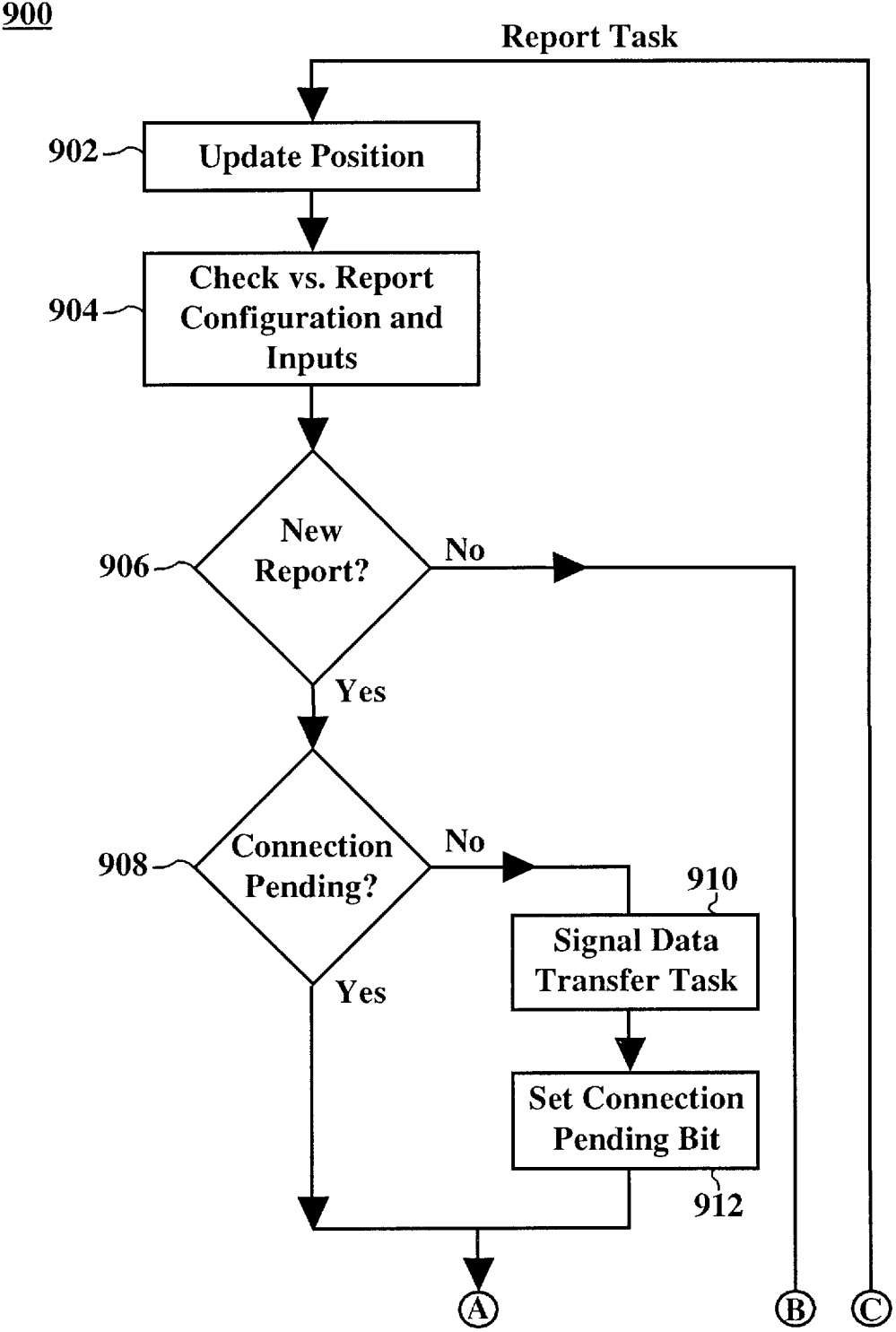
FIGS. 9A and 9B are a flow chart of reporting task steps performed by the present single shared processor in accordance with one embodiment of the present claimed invention.
Figure 9B:
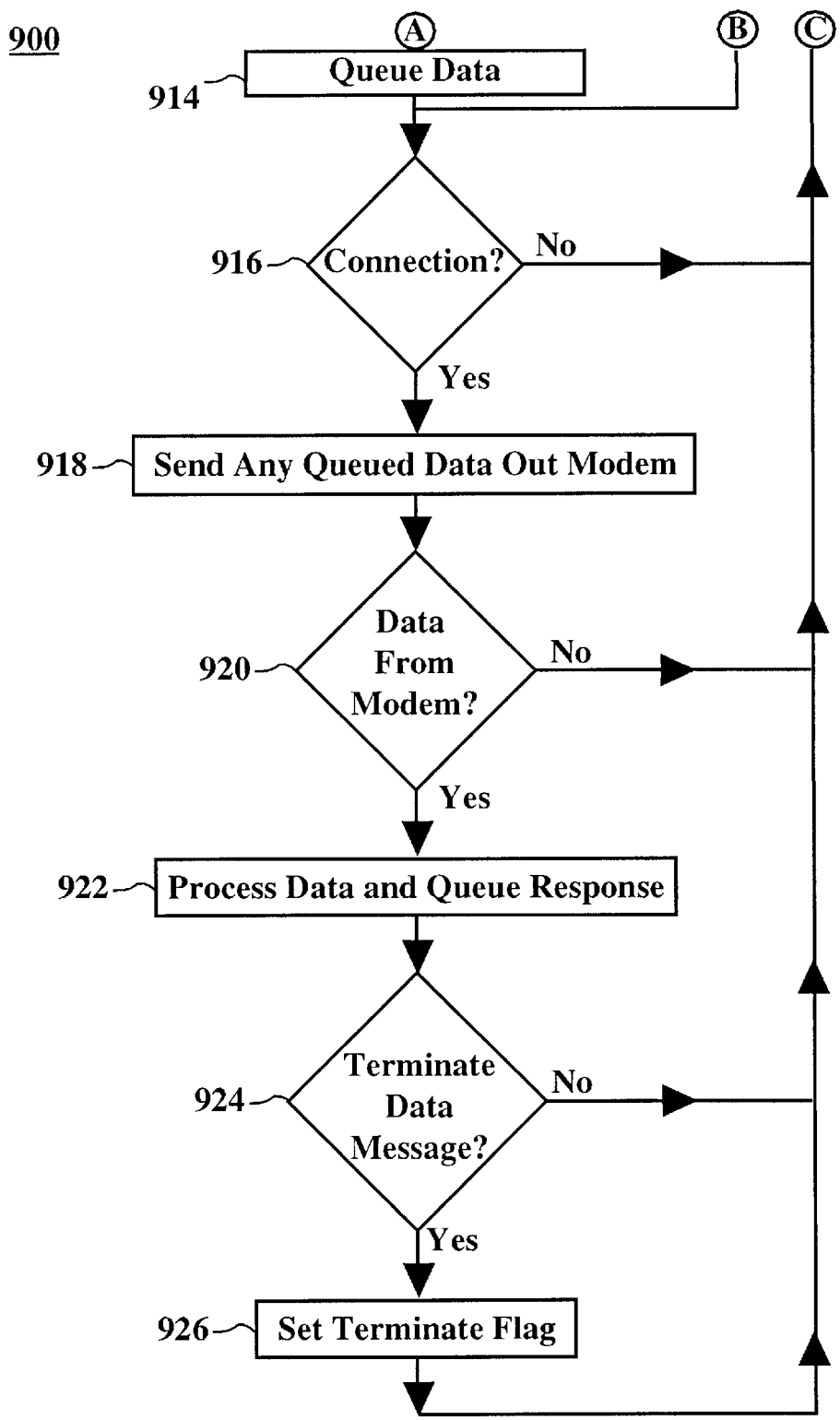
Figure 11A:
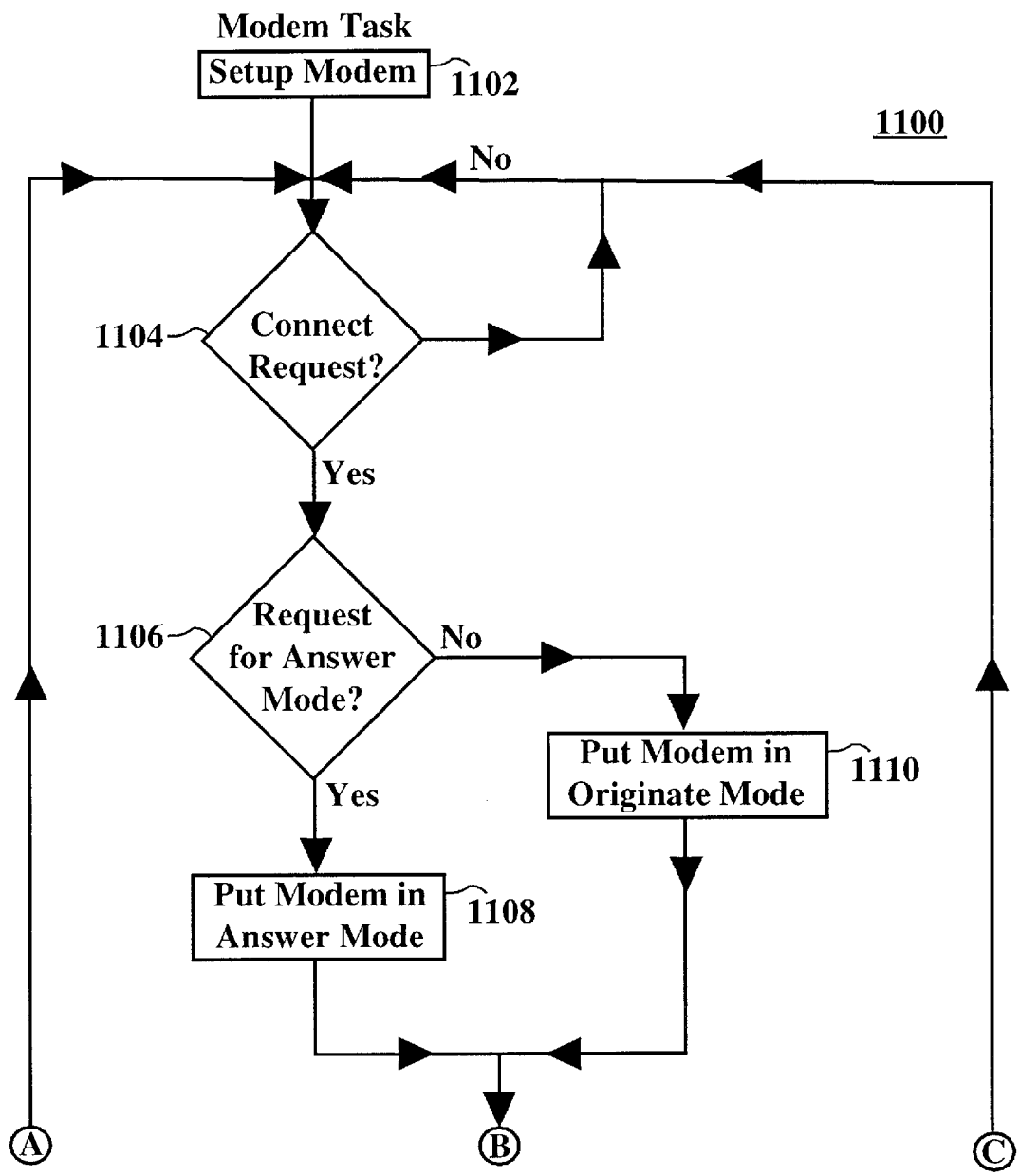
FIGS. 11A and 11B are a flow chart of modem task steps performed by the present single shared processor in accordance with one embodiment of the present claimed invention.
Figure 11B:
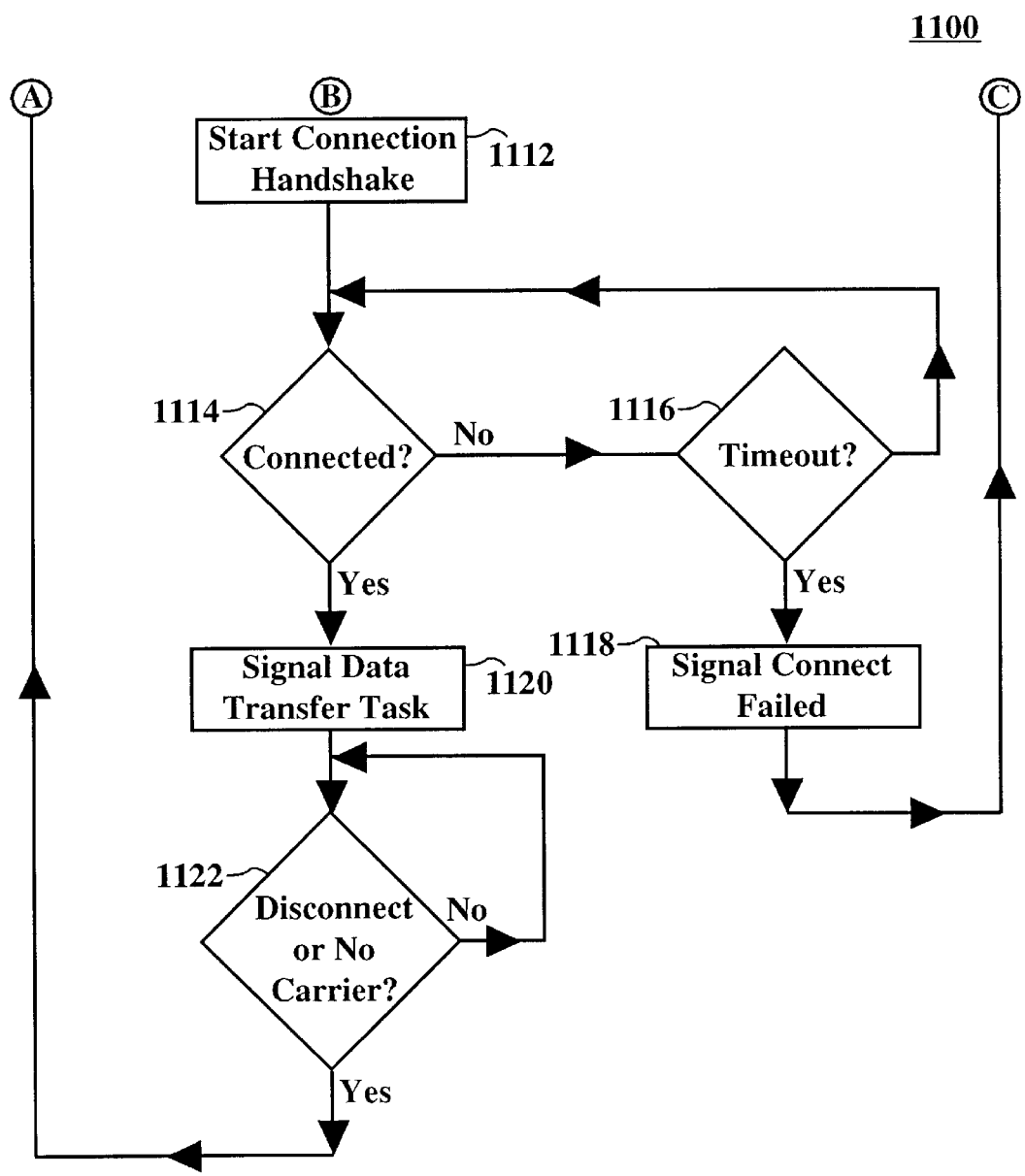
Figure 12A:
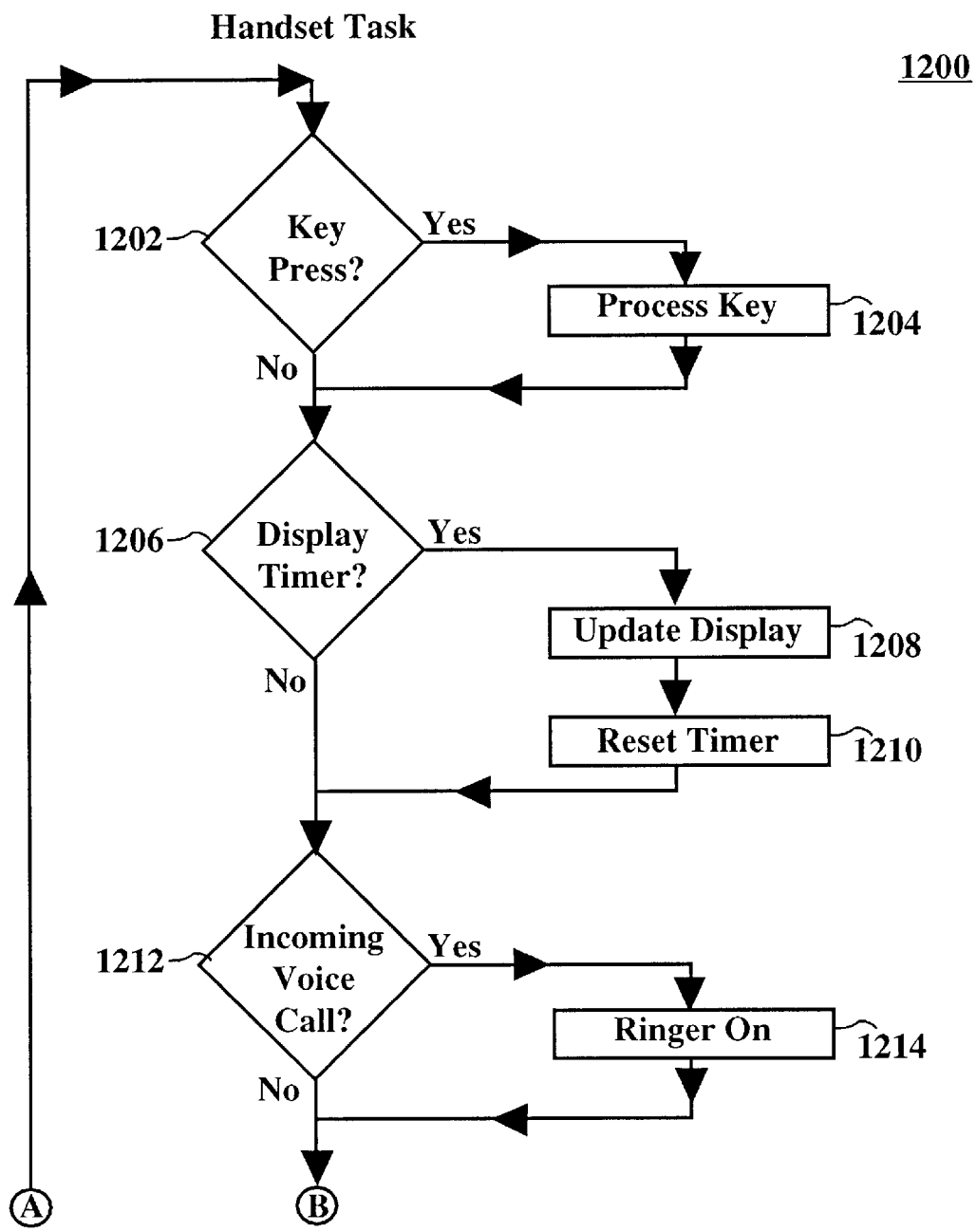
FIGS. 12A and 12B are a flow chart of handset task steps performed by the present single shared processor in accordance with one embodiment of the present claimed invention.
Figure 12B:
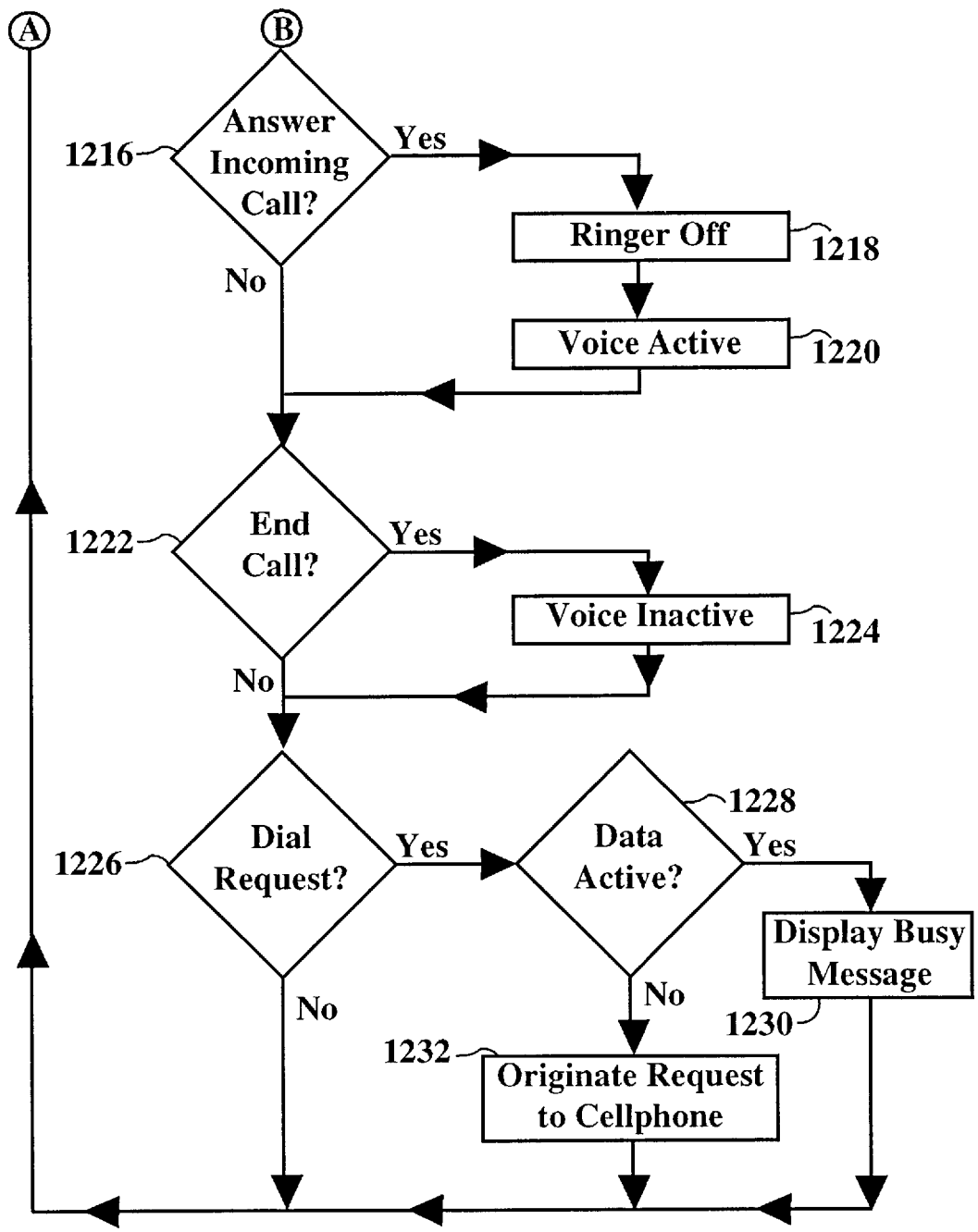

With reference next to FIGS. 9A and 9B, a flow chart 900 of steps used by reporting tasks protocol 804 of the present combined position locating and analog cellular telephone unit is shown. Flow chart 900 includes processes, which in one embodiment of the present invention are comprised of computerreadable and computer-executable instructions. The computer-readable and computer-executable instructions reside, for example, in data storage features such as memory 128 of FIG. 1. In the present embodiment, memory 128 is further comprised of, for example, computer usable volatile memory and/or computer usable non-volatile memory. The computer-readable and computerexecutable instructions are used to control, for example, the operation and functioning of position locating protocol 800, cellular telephone protocol 802, and reporting tasks protocol 804. The steps recited in FIGS. 9A and 9B describe reporting tasks performed by the present claimed invention. Additionally, the steps of FIGS. 9A and 9B will be described in conjunction with combined position locating and analog cellular telephone unit 1 of FIG. 1. Although, the following discussion of FIGS. 9A and 9B describes reporting tasks performed by the present invention, it must be understood that in the present invention numerous tasks are operating concurrently. That is, while the reporting tasks of FIGS. 9A and 9B are operating, data transfer tasks of FIGS. 10A and 10B, modem tasks of FIGS. 11A and 11B, and handset tasks of FIGS. 12A and 12B are also taking place. Each of the sets of tasks are described in detail below. Additionally, all of the following processes (i.e. the reporting tasks, the data transfer tasks, the modem tasks, and the handset tasks) operate concurrently within a multi-tasking environment, repeatedly cycle through their respective process steps, and are able to communicate with each other. Moreover, all of the following sets of tasks are controlled by single shared processor 142 of FIG. 1.

In step 902 of FIG. 9A, the present invention receives position information generated by the position locating components (i.e. GPS baseband section 144, GPS RF portion 120, and single shared processor 142) of FIG. 1.

Next, at step 904, the present invention compares the position information received in step 902 with a predetermined report configuration. Predetermined report configurations determine for example, if combined position locating and analog cellular telephone unit 1 traveled a certain distance, if a specific amount of time elapsed since previous report information was received, if combined position locating and analog cellular telephone unit 1 is at or near a given location, and the like. A detailed description of such event-based position reporting is found in commonly-owned co-pending U.S. patent application Ser. No. 08/420,242 to Goldberg et al. entitled "Personal Tracking System Integrated with Base Station" filed Apr. 11, 1995. The above-listed Goldberg et al. application is incorporated herein by reference as background material. The present invention is well suited to having the received position information compared to any one or more than one of numerous types of conditions. In step 904, the present invention also checks the discrete inputs to determine, for example, if a user of combined position locating and analog cellular telephone unit 1 has pushed a "panic" button (e.g. via I/O 134) or otherwise manually requested the generation of a position location report. A position locating report, for example, notifies a base station of the present location of combined position locating and analog cellular telephone unit 1, can notify police or other emergency response personnel of the present location of combined position locating and analog cellular telephone unit 1, and the like.

At step 906, the present invention determines whether a report must be generated. If so, the present invention proceeds to step 908. If no report is to be generated currently, the present invention proceeds as shown to step 916.

With reference now to step 908, the present invention determines whether a connection is pending. That is, the present invention determines whether another report has been generated and is currently being transferred by single shared processor 142. If no other connection is pending, the present invention proceeds to step 910. If another report is pending, the present invention proceeds, as shown in FIGS. 9A and 9B, to step 914.

In step 910 of FIG. 9A, the present invention signals the data transfer task processes of the present claimed invention. (The data transfer task processes of the present invention are described in detail below, and are shown in the flow chart of FIGS. 10A and 10B).

Next, at step the 912, the present invention sets a connection pending bit, and proceeds to step 914.

At step 914, the present invention queues the data to be transferred. That is, the position information to be transferred/reported is stored in a queue. (The data transfer task is able to pull or retrieve the data from the data queue). In the present embodiment, the queue resides in, for example, memory 138 of the present invention.

Proceeding on to step 916, the present invention determines whether a connection has been established to the location to which the position information is going to be transferred. If the connection has not been established, the present invention returns to step 902 as shown in FIG. 9A. If the connection has been established, the present invention proceeds to step 918. (The processes performed by single shared processor 142 of the present invention to achieve the establishment of the connection are described below in detail, and are shown in FIGS. 11A and 11B.)

At step 918, the present invention sends data which, at prior step 914, was stored in the queue to modem 136 of FIG. 1. (Modem 136 and various other components appear in numerous embodiments of the present invention such as, for example, FIGS. 2–4. For purposes of clarity, however, modem 136 and the various other components will be referred to in conjunction with the combined position locating and analog cellular telephone unit 1 of FIG. 1.)

Next, at step 920, because a connection to modem 136 of FIG. 1 is established, the present invention determines whether there is any data to be received from modem 136. If no data is to be received from modem 136, the present invention returns to step 902 as shown. If data is received from modem 136, the present invention proceeds to step 922.

At step 922, the single shared processor 142 of the present invention processes the received data and queues a response. For example, if the data from modem 136 is a request for the current position of combined position locating and analog cellular telephone unit 1, the present invention stores the position information in the queue. During the next cycle through the reporting tasks of FIGS. 9A and 9B, the position information of combined position locating and analog cellular telephone unit 1 is available to be sent to modem 136.

Referring now to step 924, the present invention determines whether the data message received from modem 136 was a terminate message. If not, the present invention returns to step 902. If the message received from modem 136 was a terminate message, the present invention proceeds to step 926.

As shown in step 926, the present invention sets a terminate flag. The terminate flag tells modem 136 to terminate the connection to modem 136.

Figure 10A:
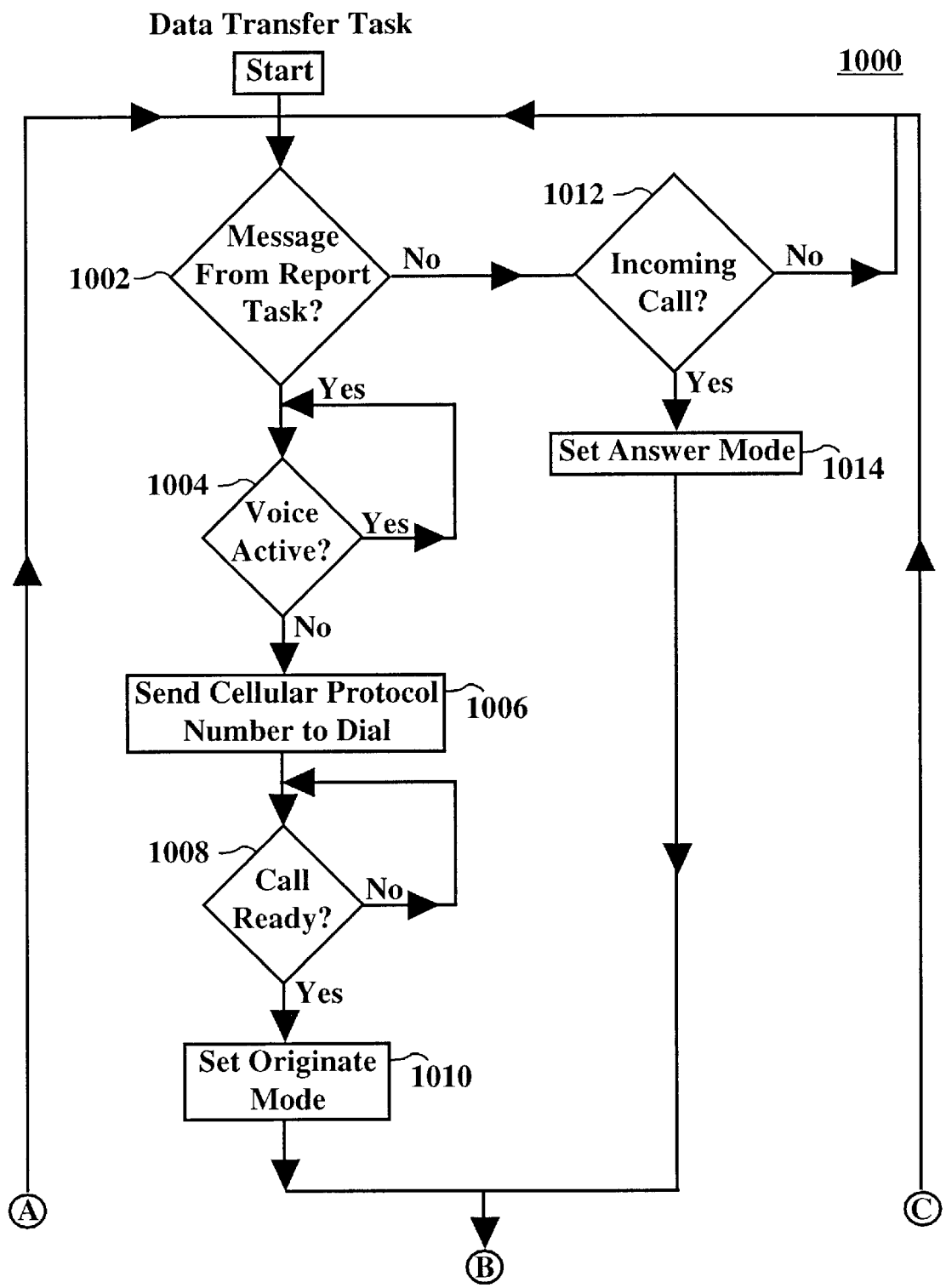
FIGS. 10A and 10B are a flow chart of data transfer task steps performed by the present single shared processor in accordance with one embodiment of the present claimed invention.
Figure 10B:
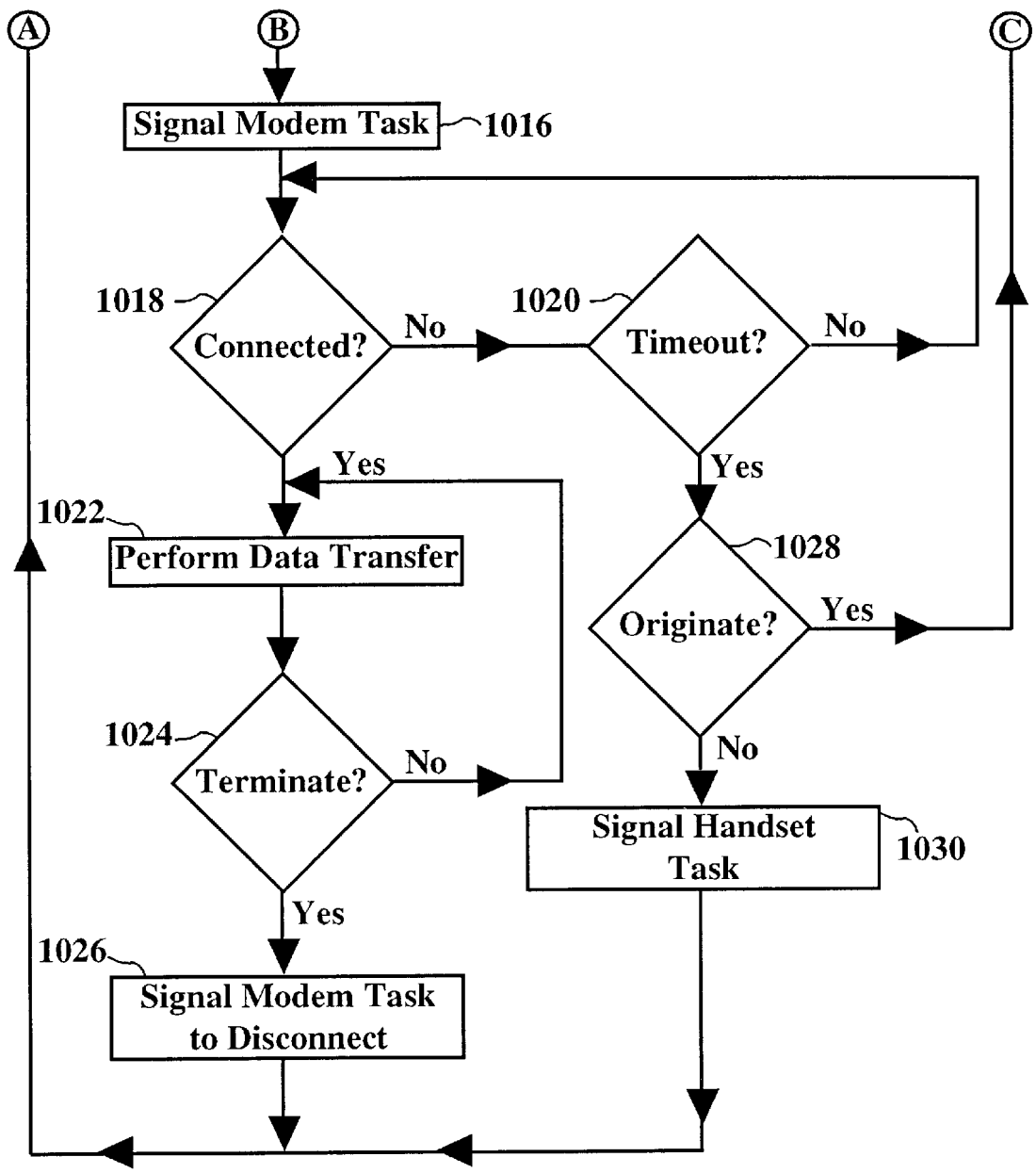

With reference now to FIGS. 10A and 10B, a flow chart 1000 of data transfer tasks performed by the present claimed invention is shown. Although, the following discussion of FIGS. 10A and 10B describes data transfer tasks performed by the present invention, it must be understood that in the present invention numerous tasks are operating concurrently. That is, while the data transfer tasks of FIGS. 10A and 10B are operating, reporting tasks of FIGS. 9A and 9B, modem tasks of FIGS. 11A and 11B, and handset tasks of FIGS. 12A and 12B are also taking place. As mentioned above, each of the sets of tasks operates concurrently within a multi-tasking environment, repeatedly cycles through its respective process steps, and is able to communicate with other tasks. At step 1002, the present invention determines whether a message from the report task processes is present. That is, the present invention determines at step 1002 whether or not the report task portion of FIGS. 9A and 9B has sent a message to the present data transfer task portion. If is message is present to be sent, the present invention proceeds to step 1004.

At step 1004 the present invention determines whether the cellular telephone is currently in a voice activated state. That is, step 1004 determines whether a user of combined position locating and analog cellular telephone unit 1 of FIG. 1 is currently using the cellular telephone, or if the cellular telephone is otherwise in use (e.g. receiving an incoming call). If so, the present invention continues to loop through step 1004 as shown in FIG. 10A until the cellular telephone is no longer active. Once the cellular telephone is available, (i.e. no longer active) the present invention proceeds to step 1006.

Step 1006 of the present invention constitutes an originate interface. That is, at step 1006, the present invention sends to cellular telephone protocol 802 of FIG. 8, the telephone number of the location to be dialed.

At step 1008 the present invention determines whether the cellular telephone is currently in a call ready state. If not, the present invention continues to loop through step 1008 as shown in FIG. 10A until the cellular telephone is in the call ready state. Once the cellular telephone is available, (e.g. assigns a communication channel) the present invention proceeds to step 1010.

In step 1010, the present invention sets an originate mode indicating that a call/report is originating from the cellular telephone portion of the present combined position locating and analog cellular telephone unit 1 of FIG. 1.

Returning briefly to step 1002, if the present invention determines that no message has been sent from the report task processes of FIGS. 9A and 9B the present invention proceeds to step 1012.

At step 1012, the present invention determines if the cellular telephone portion of combined position locating and analog cellular telephone unit 1 of FIG. 1 is receiving an incoming call. If there is no incoming call, the present invention returns to step 1002 as shown in FIG. 10A. If the cellular telephone is receiving an incoming call, the present invention proceeds to step 1014.

In step 1014, the present invention sets an answer mode indicating that the cellular telephone portion of the present combined position locating and analog cellular telephone unit 1 of FIG. 1 is receiving an incoming call. By setting either the originate mode in step 1010, or the answer mode in step 1014, the present invention indicates to modem 136 of FIG. 1, whether it is sending or receiving information.

Next, as shown by step 1016, the present invention signals the modem task. That is, the present invention tells modem 136 of FIG. 1 to activate a connection.

As shown in FIG. 10B, at step 1018 if a connection is not established the present invention proceeds to step 1020. If a connection is established, the present invention proceeds to step 1022.

At step 1022, the present transfers the data via modem 136 of FIG. 1. The data transfer occurs as described, for example, in steps 914 through 922 of FIG. 9B.

Next, at step 1024, after the transfer of the data, the present invention waits for the terminate flag to be set. The setting of the terminate flag is described at steps 924 and 926 of FIG. 9B. Once the present invention determines that the terminate flag is set, the present invention proceeds to step 1026. If the terminate flag is not yet set, the present invention continues to cycle through steps 1022 and 1024 as indicated in FIG. 10B.

In step 1026, after the terminate flag has been set, the present invention signals modem 136 of FIG. 1 to disconnect. The present invention then returns to step 1002 as shown in FIGS. 10A and 10B.

Returning to step 1018, if a connection was not established the present invention proceeds to step 1020. At step 1020, the present invention determines whether the attempt for a connection has timed out. That is, the present invention determines whether the attempt to achieve a connection has exceeded a given period of time. If the connection has timed out (e.g. a busy signal is received, modem 136 of FIG. 1 failed to negotiate due to noisy lines, and the like), the present invention proceeds to step 1028.

At step 1028, the present invention determines whether the cellular telephone portion of combined position locating and analog cellular telephone unit 1 of FIG. 1 originated the data transfer. If so, the present invention returns to step 1002 as shown in FIG. 10A. If the cellular telephone portion of combined position locating and analog cellular telephone unit 1 originated the data transfer, the present invention proceeds to step 1030.

Next, in step 1030, if the data transfer task processes of FIGS. 10A and 10B, did not originate the cellular telephone portion of combined position locating and analog cellular telephone unit 1 of FIG. 1, the present invention signals the handset task processes (See following discussion of FIGS. 12A and 12B). In so doing, the handset task portion of the present invention is made aware that the cellular telephone is receiving an incoming voice call. That is, in the present embodiment, it is first assumed that an incoming call is a data call. As a result, the present embodiment first tries to negotiate with modem 136 of FIG. 1. If the negotiation is unsuccessful, the present invention assumes the incoming call is a voice call, and signals the handset to start ringing. The present invention is, however, also well suited to various other methods and processes for distinguishing between an incoming voice call and an incoming data call. Such methods include, but are not limited to, having separate telephone numbers for voice and data calls. Once the handset task has been signaled, the present invention returns to step 1002 as shown in FIGS. 10A and 10B.

With reference now to FIGS. 11A and 11B, a flow chart 1100 of modem tasks performed by the present claimed invention is shown. Although, the following discussion of FIGS. 11A and 11B describes modem tasks performed by the present invention, it must be understood that in the present invention numerous tasks are operating concurrently. That is, while the modem tasks of FIGS. 11A and 11B are operating, reporting tasks of FIGS. 9A and 9B, data transfer tasks of FIGS. 10A and 10B, and handset tasks of FIGS. 12A and 12B are also taking place. Each of the sets of tasks operates concurrently within a multi-tasking environment, repeat cycles through its respective process steps, and is able to communicate with other tasks. At step 1102, the present invention sets up modem 136 of FIG. 1.

At step 1104, the present invention determines whether a connect request has been issued. If a connect request has not been issued, the present invention loops back to step 1104 as shown in FIG. 11A. If a connect request has been received, the present invention proceeds to step 1106. The connect request is described, for example, in data transfer task step 1016 of FIG. 10B.

Next, in step 1106 the present invention determines whether a request has been made to place modem 136 of FIG. 1 in answer mode or originate mode. Such a request is made by either data transfer task step 1014 or data transfer task step 1010 of FIG. 10A, respectively.

If modem 136 of FIG. 1 needs to be in answer mode, the present invention proceeds to step 1108 and places modem 136 in answer mode. If modem 136 needs to be in originate mode, the present invention proceeds to step 1110 and places modem 136 is placed into originate mode. From either step 1108 or 1110, the present invention proceeds to step 1112.

At step 1112, the present invention starts the modem connection handshake. As mentioned above, in the present embodiment, modem 136 of FIG. 1 is a YTM411B modem available from Yamaha Corporation of Tokyo, Japan. Modem 136 of the present embodiment has an automatic handshake function. In so doing, modem 136 can be configured to complete the handshake and then indicate that either a connection has been established, or that the handshake attempt has timed out. The handshake indicates factors and conditions such as, for example, the baud rate, mode of connection, modem protocol, and the like.

Step 1114 of the present invention determines whether the attempt for a connection has been achieved. If the attempt for a connection has not been achieved, the present invention proceeds to step 1116.

In step 1116, the present invention determines whether the connection has timed out. If the attempt for a connection has not timed out the present invention returns to step 1114 as shown in FIG. 11B. If the attempt for a connection has timed out, the present invention proceeds to step 1118.

At step 1118, the present invention signals data transfer tasks 1000 that the attempt for a connection has failed or has timed out and returns to step 1104 as shown.

Provided that the attempt for a connection in step 1114 was successful, the present invention proceeds to step 1120. At step 1120, the present invention signals data transfer tasks 1000 that a connection is established. The present invention then proceeds to step 1122.

At step 1122, the present invention determines whether a disconnect signal (e.g. a signal from reporting tasks of FIGS. 9A and 9B) or a no carrier signal (e.g. the connected party hangs up) has been received. If no such signal has been received, the connection established at step 1114 remains active. Once such a signal has been received, the present invention returns to step 1104 as shown.

With reference now to FIGS. 12A and 12B, a flow chart 1200 of handset tasks performed by the present claimed invention is shown. Although, the following discussion of FIGS. 12A and 12B describes handset tasks performed by the present invention, it must be understood that in the present invention numerous tasks are operating concurrently. That is, while the handset tasks of FIGS. 12A and 12B are operating, reporting tasks of FIGS. 9A and 9B, data transfer tasks of FIGS. 10A and 10B, and modem tasks of FIGS. 11A and 11B are also taking place. As mentioned above, each of the sets of tasks operates concurrently within a multi-tasking environment, repeatedly cycles through its respective process steps, and is able to communicate with other tasks. At step 1202, the present invention detects whether a user activated key/button has been pressed. Step 1202 of the present invention applies whether handset/keypad (See e.g. keypad 502 of FIG. 5) is integral with or externally located with respect to combined position locating and analog cellular telephone unit 1 of FIG. 1.

As shown in step 1204, if a key has been pressed, the present invention processes and performs the activity requested by the pressed key. After step 1204 or after step 1202, the present invention proceeds to step 1206.

At step 1206, the present invention determines whether it is time to update the display screen (See e.g. display screen 504 of FIG. 5, or screen 702 of FIG. 7). In the present embodiment, the display is updated twice a second. The present invention is well suited to requiring updates of the display screen at various other longer or shorter time intervals. The display update is used to correctly maintain, for example, a cellular signal strength indicator bar, a battery power level, and the like. If the requisite period of time has passed, the present invention proceeds to steps 1208 and 1210.

At steps 1208 and 1210, the present invention updates the display and resets the display timer. After either step 1210 or step 1206, the present invention proceeds to step 1212.

Next, at step 1212, the present invention determines whether a call is incoming. The generation of an incoming voice call signal is described, for example, in data transfer task step 1030 of FIG. 10B.

In step 1214, the ringer of the handset (e.g. handset 500 of FIG. 5 or handset 602 of FIG. 6) turned on, provided the present invention determines that a call is incoming at step 1212. After either step 1212 or step 1214, the present invention proceeds to step 1216.

As shown in step 1216, the present invention then determines whether the user of combined position locating and analog cellular telephone unit 1 of FIG. 1 has answered the incoming call.

In steps 1218 and 1220, once the user has answered the incoming call, the present invention turns the ringer off (step 1218) and makes the incoming voice data active (step 1220). After either step 1216 or step 1220, the present invention proceeds to step 1222.

At step 1222, the present invention determines whether the user has ended the active voice call. Such action is indicated, for example, when the user "hangs up" the cellular telephone.

If the user has ended the voice call, the present invention places the cellular telephone in a voice inactive state, as shown in step 1224. After either step 1224 or step 1222, the present invention proceeds to step 1226.

In step 1226, the present invention determines whether a dial request has been received. That is, is the user attempting to dial the cellular telephone. If no dial request is present, the present invention returns to step 1202 as shown. If the user is, in fact, attempting to dial the cellular telephone, the present invention proceeds to step 1228.

At step 1228, the present invention determines whether the cellular telephone is already active sending or receiving data. That is, is the present combined position locating and analog cellular telephone unit 1 of FIG. 1, already attempting to send or receive data information via modem 136. If the cellular telephone is already active, the present invention proceeds to step 1230.

Next, at step 1230, the present invention indicates by displaying, for example, on display screen 504 of FIG. 5, or screen 702 of FIG. 7, that the cellular telephone is busy. The present invention is also well suited to indicating that the cellular telephone is already in use using other methods such as, for example, emitting an audible busy signal. Once the busy indication is made, the present invention returns to step 1202 as shown in FIG. 12A.

As shown in step 1232, assuming that in step 1228 the present invention determines that the cellular telephone is not busy, the present invention sends an outgoing call originate request to the cellular telephone. In so doing, the user is then able to make a cellular telephone call using present combined position locating and analog cellular telephone unit 1 of FIG. 1.

Again, as mentioned above, all of the above-described sets of tasks (i.e. the reporting tasks, the data transfer tasks, the modem tasks, and the handset tasks) are controlled by single shared processor 142 of FIG. 1.

Although the foregoing tasks and steps have been described in a particular order, the present invention is well suited to varying the order in which the various steps are performed. Likewise, the present invention is also well suited to varying the manner in which the separate sets of tasks interface and communicate with each other.

Thus, the present invention provides a combined position locating and analog cellular telephone unit having a single shared processor. The present combined position locating and analog cellular telephone unit does not have the additional bulk, cost, and complexity associated with prior art combined position locating and analog cellular telephone devices.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A compact integral position locating and cellular telephone unit, said compact integral unit comprising:
   a position locating system;
   a cellular telephone system integral with and coupled to said position locating system; and
   a single shared processor coupled to said position locating system and said cellular telephone system, said single shared processor adapted to control functioning of both said position locating system and said cellular telephone system such that only one processor is required to control functions and operations of both said position locating system and said cellular telephone system.

2. The integral position locating and cellular telephone unit of claim 1 wherein said position locating system, said cellular telephone system, and said single shared processor are disposed on a common single substrate.

3. The integral position locating and cellular telephone unit of claim 1 further comprising:
   a user input device integral with and coupled to said position locating system and said cellular telephone system for manipulating said position locating system and said cellular telephone system of said integral position locating and cellular telephone unit.

4. The integral position locating and cellular telephone unit of claim 1 further comprising:

a display integral with and coupled to said position locating system and said cellular telephone system for displaying position location related information.

5. The integral position locating and cellular telephone unit of claim 1 further comprising:

a display integral with and coupled to said position locating system and said cellular telephone system for displaying cellular telephone related information.

6. The integral position locating and cellular telephone unit of claim 1 further comprising:

a display integral with and coupled to said position locating system and said cellular telephone system for displaying position location related and cellular telephone related information.

7. The integral position locating and cellular telephone unit of claim 1 wherein a position locating baseband section is integral with said single shared processor.

8. The integral position locating and cellular telephone unit of claim 1 wherein a cellular telephone baseband section is integral with said single shared processor.

9. The integral position locating and cellular telephone unit of claim 1 wherein both a position locating baseband section and a position locating baseband section are integral with said single shared processor.

10. In an integral position locating and cellular telephone unit a method for controlling the operation of an integral position locating system and a cellular telephone system with a single shared processor, said method comprising the computer implemented steps of:

a) generating position information indicating the position of said integral position locating and cellular telephone unit, said position information generated by said position locating system;

b) communicatively coupling said position locating system to said cellular telephone system such that said position information generated by said position locating system is accessible by said cellular telephone system; and c) communicatively coupling a modem to said cellular telephone system, said modem disposed integral with said integral position locating and cellular telephone unit, such that said integral position locating and cellular telephone unit can receive or transmit data via said modem.

11. The computer implemented method as recited in claim 10 further including the steps of:

d) prompting the generation of said position information upon the occurrence of a predetermined event;

e) having said cellular telephone system access said position generated in step d); and f) forwarding said position information to a location outside of said combined position locating and analog cellular telephone unit.

12. The computer implemented method as recited in claim 11 wherein step d) further comprises the step of:

prompting said generation of said position information based upon the group of predetermined events consisting of said combined position location and cellular telephone unit traveling a certain distance, a specific amount of time elapsing since a previous prompting of said generation of said position information, and said combined position locating and analog cellular telephone unit approaching or at a selected location.

13. The computer implemented method as recited in claim 11 wherein step d) further comprises the step of:

prompting said generation of said position information upon receipt at said cellular telephone system of a request for position information.

14. The computer implemented method as recited in claim 10 wherein step a) further comprises the step of:

generating position information indicating the position of said combined position locating and analog cellular telephone unit using a GPS based position location system.

15. An integral position location and cellular telephone unit comprising:

a single shared processor adapted to control operation of an integral position locating system and cellular telephone system;

an address/data bus coupled to said single shared processor;

a computer readable memory coupled to communicate with said single shared processor, said single shared processor for performing the steps of:

a) generating position information indicating the position of said integral position locating and cellular telephone unit, said position information generated by said position locating system;

b) communicatively coupling said position locating system to said cellular telephone system such that said position information generated by said position locating system is accessible by said cellular telephone system; and c) communicatively coupling a modem to said cellular telephone system, said modem disposed integral with said integral position locating and cellular telephone unit, such that said integral position locating and cellular telephone unit can receive or transmit data via said modem.

16. The computer implemented method as recited in claim 15 further including the steps of:

d) prompting the generation of said position information upon the occurrence of a predetermined event;

e) having said cellular telephone system access said position generated in step d); and f) forwarding said position information to a location outside of said combined position locating and analog cellular telephone unit.

17. The computer implemented method as recited in claim 16 wherein step d) further comprises the step of:

prompting said generation of said position information based upon the group of predetermined events consisting of said combined position location and cellular telephone unit traveling a certain distance, a specific amount of time elapsing since a previous prompting of said generation of said position information, and said combined position locating and analog cellular telephone unit approaching or at a selected location.

18. The computer implemented method as recited in claim 16 wherein step d) further comprises the step of:

prompting said generation of said position information upon receipt at said cellular telephone system of a request for position information.

19. The computer implemented method as recited in claim 15 wherein step a) further comprises the step of:

generating position information indicating the position of said combined position locating and analog cellular telephone unit using a GPS based position location system.

20. A computer-usable medium having computer-readable program code embodied therein for causing an integral position locating and cellular telephone unit controlled by a single shared processor to perform the steps of:
  a) generating position information indicating the position of said integral position locating and cellular telephone unit, said position information generated by said position locating system;
  b) communicatively coupling said position locating system to said cellular telephone system such that said position information generated by said position locating system is accessible by said cellular telephone system; and
  c) communicatively coupling a modem to said cellular telephone system, said modem disposed integral with said integral position locating and cellular telephone unit, such that said integral position locating and cellular telephone unit can receive or transmit data via said modem.

21. The computer implemented method as recited in claim 20 further including the steps of:
  d) prompting the generation of said position information upon the occurrence of a predetermined event;
  e) having said cellular telephone system access said position generated in step d); and
  f) forwarding said position information to a location outside of said combined position locating and analog cellular telephone unit.

22. The computer implemented method as recited in claim 21 wherein step d) further comprises the step of:
  prompting said generation of said position information based upon the group of predetermined events consisting of said combined position location and cellular telephone unit traveling a certain distance, a specific amount of time elapsing since a previous prompting of said generation of said position information, and said combined position locating and analog cellular telephone unit approaching or at a selected location.

23. The computer implemented method as recited in claim 21 wherein step d) further comprises the step of:
  prompting said generation of said position information upon receipt at said cellular telephone system of a request for position information.

24. The computer implemented method as recited in claim 20 wherein step a) further comprises the step of:
  generating position information indicating the position of said combined position locating and analog cellular telephone unit using a GPS based position location system.

25. A compact integral position locating and cellular telephone unit, said compact integral position locating and cellular telephone unit comprising:
  a position locating system;
  a cellular telephone system integral with and coupled to said position locating system;
  a single shared processor coupled to said position locating system and said cellular telephone system, said single shared processor adapted to control functioning of both said position locating system and said cellular telephone system such that only one processor is required to control functions and operations of both said position locating system and said cellular telephone system;
  a common single substrate, said position locating system, said cellular telephone system, and said single shared processor disposed on said common single substrate,
  a user input device integral with and coupled to said position locating system and said cellular telephone system for manipulating said position locating system and said cellular telephone system; and
  a display integral with and coupled to said position locating system and said cellular telephone system for displaying position location related and cellular telephone related information.

* * * * *